United States Patent
Okamoto et al.

(10) Patent No.: US 11,911,962 B2
(45) Date of Patent: Feb. 27, 2024

(54) THREE-DIMENSIONALLY SHAPED ARTICLE PRODUCTION APPARATUS WITH A POROUS STAGE AND SUPPORT BODY

(71) Applicant: SEIKO EPSON CORPORATION, Tokyo (JP)

(72) Inventors: Eiji Okamoto, Matsumoto (JP); Shinichi Nakamura, Okaya (JP); Koki Hirata, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 16 days.

(21) Appl. No.: 17/477,153

(22) Filed: Sep. 16, 2021

(65) Prior Publication Data
US 2022/0001605 A1 Jan. 6, 2022

Related U.S. Application Data

(63) Continuation of application No. 15/014,089, filed on Feb. 3, 2016, now abandoned.

(30) Foreign Application Priority Data

Feb. 4, 2015 (JP) .................................. 2015-020009

(51) Int. Cl.
*B29C 64/245* (2017.01)
*B33Y 30/00* (2015.01)
(Continued)

(52) U.S. Cl.
CPC ............ *B29C 64/245* (2017.08); *B22F 7/004* (2013.01); *B22F 10/14* (2021.01); *B22F 10/38* (2021.01);
(Continued)

(58) Field of Classification Search
CPC .................................................... B29C 64/245
See application file for complete search history.

(56) References Cited

U.S. PATENT DOCUMENTS

3,264,720 A * 8/1966 Mott .................... B22F 3/1109
118/62
3,328,139 A 6/1967 Hodge
(Continued)

FOREIGN PATENT DOCUMENTS

CA 2886438 4/2014
JP 46-027926 B 8/1971
(Continued)

OTHER PUBLICATIONS

Power & Motion, Fundamentals of Vacuum, Jan. 1, 2012, Endeavor Business Media, LLC, available at <https://www.powermotiontech.com/pneumatics/vacuum-technology/article/21882601/fundamentals-of-vacuum>. (Year: 2012).*

*Primary Examiner* — Xiao S Zhao
*Assistant Examiner* — Nicholas J Chidiac
(74) *Attorney, Agent, or Firm* — WORKMAN NYDEGGER (57) ABSTRACT

A three-dimensionally shaped article production member is a member used in a three-dimensionally shaped article production apparatus for producing a three-dimensionally shaped article by stacking a layer formed using a composition containing particles. The member is placed on a stage and comes in contact with the layer, and has a portion provided with pores in a contact surface with the layer.

13 Claims, 4 Drawing Sheets

(51) Int. Cl.
  *B29C 64/20* (2017.01)
  *B22F 12/30* (2021.01)
  *B33Y 10/00* (2015.01)
  *B33Y 80/00* (2015.01)
  *B22F 7/00* (2006.01)
  *B29C 64/165* (2017.01)
  *B22F 10/14* (2021.01)
  *B22F 10/38* (2021.01)
  *B22F 10/68* (2021.01)

(52) U.S. Cl.
  CPC ............ *B22F 12/30* (2021.01); *B29C 64/165* (2017.08); *B29C 64/20* (2017.08); *B33Y 10/00* (2014.12); *B33Y 30/00* (2014.12); *B33Y 80/00* (2014.12); *B22F 10/68* (2021.01); *Y02P 10/25* (2015.11)

(56) References Cited

U.S. PATENT DOCUMENTS

| | | |
|---|---|---|
| 3,581,902 A | 6/1971 | Bidler |
| 3,732,107 A | 5/1973 | Faust |
| 3,857,885 A | 12/1974 | Faust |
| 4,458,006 A | 7/1984 | Döenges et al. |
| 4,495,271 A | 1/1985 | Geissler et al. |
| 4,530,747 A | 7/1985 | Döenges et al. |
| 4,987,053 A | 1/1991 | Gersdorf et al. |
| 5,200,299 A | 4/1993 | Steppan et al. |
| 5,342,919 A | 8/1994 | Dickens et al. |
| 5,453,242 A * | 9/1995 | Knoess .................. B22F 3/1109 419/49 |
| 5,527,877 A | 6/1996 | Dickens et al. |
| 5,648,450 A | 7/1997 | Dickens et al. |
| 5,745,834 A | 4/1998 | Bampton |
| 5,990,268 A | 11/1999 | Dickens et al. |
| 6,136,948 A | 10/2000 | Dickens et al. |
| 2002/0195747 A1 | 12/2002 | Hull et al. |
| 2003/0180171 A1 | 9/2003 | Artz |
| 2012/0118815 A1 | 5/2012 | Abedini |
| 2014/0178588 A1 | 6/2014 | Swanson |
| 2014/0202595 A1 | 7/2014 | Hofmann |
| 2015/0064019 A1 | 3/2015 | Lacy |
| 2015/0246485 A1 | 9/2015 | Guenster et al. |
| 2016/0082670 A1* | 3/2016 | Paroda .................... B29C 64/40 425/375 |
| 2021/0086397 A1* | 3/2021 | Asano .................. B29C 64/232 |

FOREIGN PATENT DOCUMENTS

| | | |
|---|---|---|
| JP | 48-041708 B | 12/1973 |
| JP | 51-047334 B | 12/1976 |
| JP | 54-021726 B | 8/1979 |
| JP | 57-196231 A | 12/1982 |
| JP | 59-005240 A | 1/1984 |
| JP | 59-005241 A | 1/1984 |
| JP | 01-165613 A | 6/1989 |
| JP | 02-226149 A | 9/1990 |
| JP | 2003-053847 A | 2/2003 |
| JP | 2005-120347 A | 5/2005 |
| JP | 2013-176893 A | 9/2013 |
| WO | 2014049159 A1 | 4/2014 |

* cited by examiner

THREE-DIMENSIONALLY SHAPED ARTICLE PRODUCTION APPARATUS WITH A POROUS STAGE AND SUPPORT BODY

CROSS-REFERENCE TO RELATED APPLICATIONS

The present application is a Continuation of U.S. patent application Ser. No. 15/014,089, filed Feb. 3, 2016, which claims priority to Japanese Application No. 2015-020009, filed Feb. 4, 2015. The foregoing applications are expressly incorporated by reference herein.

BACKGROUND

1. Technical Field

The present invention relates to a three-dimensionally shaped article production member, a three-dimensionally shaped article production apparatus, a three-dimensionally shaped article production method, and a three-dimensionally shaped article.

2. Related Art

There has been known a technique for shaping a three-dimensionally shaped article by forming material layers (unit layers) using a composition containing a powder (particles) and stacking the layers (see, for example JP-A-2003-53847). In this technique, a three-dimensionally shaped article is shaped by repeating a procedure as follows. First, a material layer is formed by thinly spreading a powder to a uniform thickness, and a bonded part is formed by selectively bonding the powder particles to one another only in a desired portion of this material layer. As a result, a member in the form of a thin plate (hereinafter referred to as "cross-sectional member") is formed in the bonded part in which the powder particles are bonded to one another. Thereafter, a material layer is further formed thinly on the material layer, and a bonded part is formed by selectively bonding the powder particles to one another only in a desired portion. As a result, a new cross-sectional member is formed also in the newly formed material layer. At this time, the newly formed cross-sectional member is bonded also to the previously formed cross-sectional member. By repeating such a procedure to stack a cross-sectional member (bonded part) in the form of a thin plate one by one, a three-dimensionally shaped article can be shaped.

However, in the related art, in a production process for a three-dimensionally shaped article, a powder (particles) constituting a composition is blown (scattered) so that the dimensional accuracy of a three-dimensionally shaped article to be produced is sometimes deteriorated.

SUMMARY

An advantage of some aspects of the invention is to provide a three-dimensionally shaped article production member capable of producing a three-dimensionally shaped article with excellent dimensional accuracy with excellent productivity and excellent stability, to provide a three-dimensionally shaped article production apparatus capable of producing a three-dimensionally shaped article with excellent dimensional accuracy with excellent productivity and excellent stability, to provide a three-dimensionally shaped article production method capable of producing a three-dimensionally shaped article with excellent dimensional accuracy with excellent productivity and excellent stability, and to provide a three-dimensionally shaped article with excellent dimensional accuracy produced using the three-dimensionally shaped article production method and the three-dimensionally shaped article production apparatus.

The advantage can be achieved by the invention described below.

A three-dimensionally shaped article production member according to an aspect of the invention is a member used in a three-dimensionally shaped article production apparatus for producing a three-dimensionally shaped article by stacking a layer formed using a composition containing particles, wherein the member is placed on a stage and comes in contact with the layer, and has a portion provided with pores in a contact surface with the layer.

According to this, a three-dimensionally shaped article production member capable of producing a three-dimensionally shaped article with excellent dimensional accuracy with excellent productivity and excellent stability can be provided.

It is preferred that the three-dimensionally shaped article production member according to the aspect of the invention is in the form of a plate.

According to this, the three-dimensionally shaped article production member can be stably placed on the stage, and the handleability of the three-dimensionally shaped article production member becomes particularly excellent.

It is preferred that the three-dimensionally shaped article production member according to the aspect of the invention includes a first portion which has the pores and a second portion which does not have the pores or has the pores which are sealed.

According to this, the three-dimensionally shaped article production member can be favorably adsorbed onto the stage by suction, and the stability of the production of a three-dimensionally shaped article can be made particularly excellent.

It is preferred that in the three-dimensionally shaped article production member according to the aspect of the invention, the second portion is provided in a region which does not overlap with a portion constituting a tangible part of the three-dimensionally shaped article in the layer when the layer is viewed in plan view.

According to this, the dimensional accuracy of the finally obtained three-dimensionally shaped article can be made higher.

It is preferred that the three-dimensionally shaped article production member according to the aspect of the invention has a portion constituted by a sintered body of particles constituted by a metal material or a ceramic material.

According to this, the strength, heat resistance, durability, and the like of the three-dimensionally shaped article production member can be made particularly excellent. Further, the shape stability and handleability thereof also become excellent, and thus, it is also possible to favorably transfer the member in a state where a stacked body obtained by staking a plurality of layers is placed thereon.

It is preferred that in the three-dimensionally shaped article production member according to the aspect of the invention, the average pore diameter of the pores is 0.1 μm or more and 100 μm or less.

According to this, the suction of the layer through the pores can be more favorably performed. Further, the ease of cleaning or washing, durability, and the like of the three-dimensionally shaped article production member can be made particularly excellent. In addition, the three-dimensionally shaped article production member can be easily and reliably produced by a sintering method or the like.

It is preferred that in the three-dimensionally shaped article production member according to the aspect of the invention, the composition contains a solvent in addition to the particles.

According to this, the solvent can be efficiently removed from the layer. In the related art, in the case where a composition containing particles and a solvent is used as a layer forming composition, it is difficult to sufficiently remove the solvent from the inside of the layer of the composition, and therefore, problems arise such that the mechanical strength or dimensional accuracy of a three-dimensionally shaped article cannot be made sufficiently excellent, and when the content of the solvent in the layer is tried to be sufficiently decreased, the productivity of a three-dimensionally shaped article is significantly decreased, the durability and reliability of a three-dimensionally shaped article are decreased, etc. However, according to the invention, even in the case where a composition containing a solvent is used as the layer forming composition, the occurrence of problems as described above can be reliably prevented. Accordingly, the effect of the invention is more remarkably exhibited in the case where the layer forming composition contains particles and a solvent.

A three-dimensionally shaped article production apparatus according to an aspect of the invention includes the three-dimensionally shaped article production member according to the aspect of the invention.

According to this, a three-dimensionally shaped article production apparatus capable of producing a three-dimensionally shaped article with excellent dimensional accuracy with excellent productivity and excellent stability can be provided.

A three-dimensionally shaped article production apparatus according to an aspect of the invention is an apparatus for producing a three-dimensionally shaped article by stacking a layer formed using a composition containing particles, and includes a three-dimensionally shaped article production member having pores, a stage, on which the three-dimensionally shaped article production member is placed, and a suction unit for sucking the layer through the pores.

According to this, a three-dimensionally shaped article production apparatus capable of producing a three-dimensionally shaped article with excellent dimensional accuracy with excellent productivity and excellent stability can be provided.

A three-dimensionally shaped article production method according to an aspect of the invention is a method for producing a three-dimensionally shaped article by stacking a layer and includes a layer forming step of forming the layer using a layer forming composition containing particles in a region which overlaps with a three-dimensionally shaped article production member having pores when viewed in plan view, and a bonded part forming step of forming a bonded part by bonding the particles to one another, wherein a series of these steps is performed repeatedly, and when performing a series of these steps, the layer is sucked through the pores.

According to this, a three-dimensionally shaped article production method capable of producing a three-dimensionally shaped article with excellent dimensional accuracy with excellent productivity and excellent stability can be provided.

It is preferred that in the three-dimensionally shaped article production method according to the aspect of the invention, the bonded part is formed by applying a binding solution to the layer formed using the layer forming composition.

According to this, the mechanical strength of a three-dimensionally shaped article can be made excellent. Further, the energy amount required for forming the bonded part can be decreased.

A three-dimensionally shaped article according to an aspect of the invention is produced using the three-dimensionally shaped article production apparatus according to the aspect of the invention.

According to this, a three-dimensionally shaped article with excellent dimensional accuracy can be provided.

A three-dimensionally shaped article according to an aspect of the invention is produced using the three-dimensionally shaped article production method according to the aspect of the invention.

According to this, a three-dimensionally shaped article with excellent dimensional accuracy can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the accompanying drawings.

Three-Dimensionally Shaped Article Production Method and Three-Dimensionally Shaped Article Production Member First, a three-dimensionally shaped article production method and a three-dimensionally shaped article production member according to the invention will be described.

FIGS. 1A to 1H are cross-sectional views schematically showing respective steps in a preferred embodiment of a three-dimensionally shaped article production method according to the invention. FIG. 2 is a perspective view schematically showing a preferred embodiment of a three-dimensionally shaped article production member according to the invention.

As shown in FIGS. 1A to 1H, the production method of this embodiment is configured as follows. The method includes a layer forming step (FIGS. 1A and 1D) in which a layer 1 having a given thickness is formed using a composition containing particles (layer forming composition) 11, a binding solution application step (FIGS. 1B and 1E) in which a binding solution 12 is applied to the layer 1 by an inkjet method, and a curing step (FIGS. 1C and 1F) in which a cured part (bonded part) 13 is formed in the layer 1 by curing a bonding agent contained in the binding solution 12 applied to the layer 1 to bond the particles to one another. These steps are sequentially and repeatedly performed (FIG. 1G), and the method further includes thereafter an unbonded particle removal step (FIG. 1H) in which among the particles constituting the respective layers 1, the particles which are not bonded to one another by the bonding agent are removed.

Figure 1A:
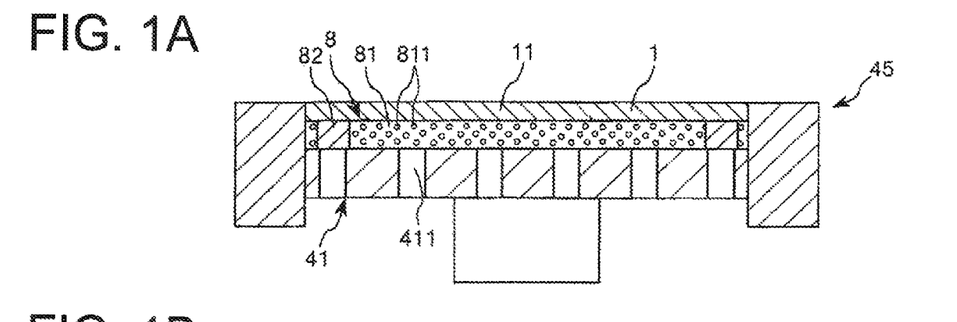
FIGS. 1A to 1H show cross-sectional views schematically illustrating respective steps in a preferred embodiment of a three-dimensionally shaped article production method according to the invention.
Figure 1B:
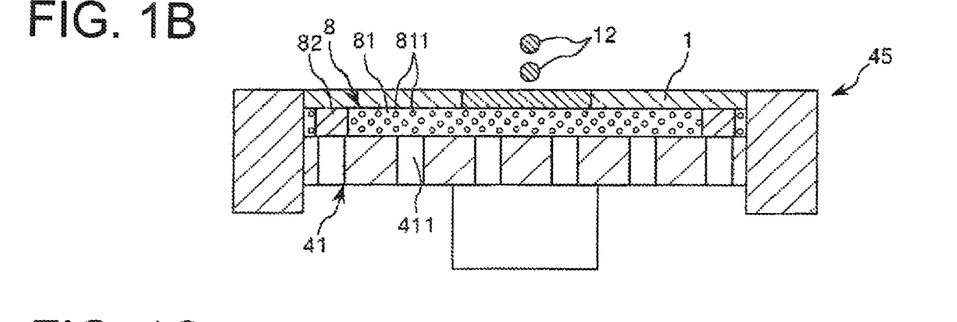
Figure 1C:
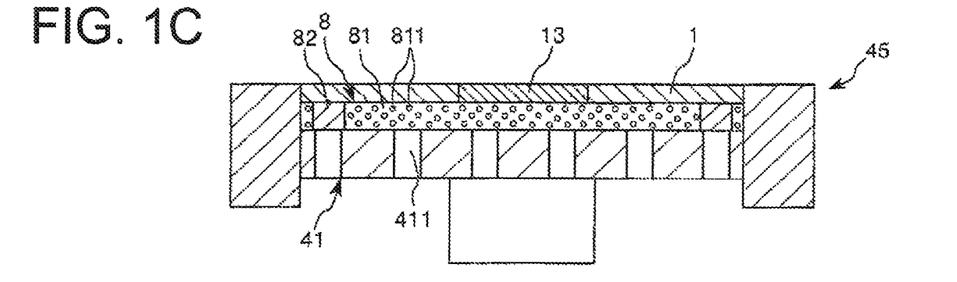
Figure 1D:
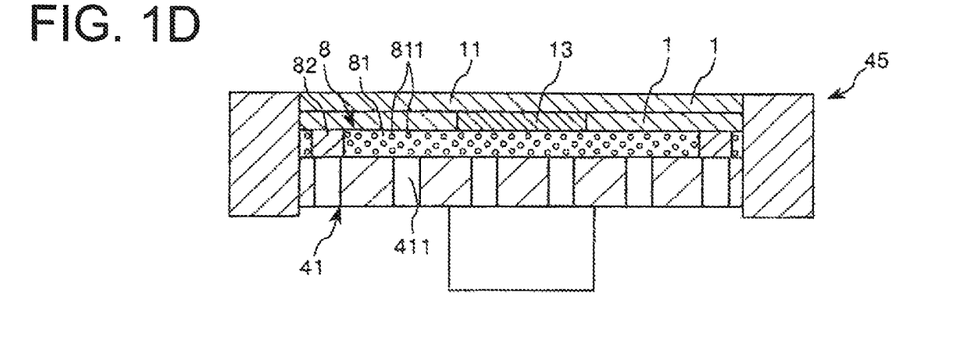
Figure 2:
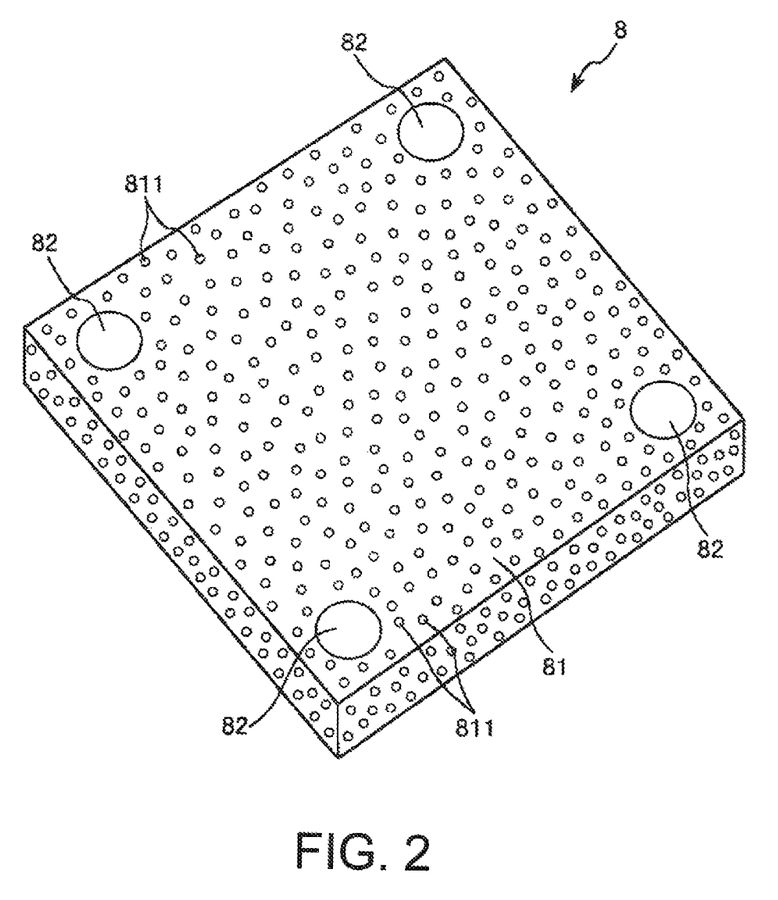
FIG. 2 is a perspective view schematically showing a preferred embodiment of a three-dimensionally shaped article production member according to the invention.

In the layer forming step, the layer 1 is formed using the layer forming composition 11 containing particles in a region which overlaps with a three-dimensionally shaped article production member 8 having pores 811 when viewed in plan view (see FIGS. 1A and 1D).

Then, in a series of these steps to be repeatedly performed, the layer 1 is sucked toward the stage 41 side through the pores 811. By doing this, undesirable scattering of the particles (powder) in the production process for a three-dimensionally shaped article 10 can be prevented, and the three-dimensionally shaped article 10 with excellent dimensional accuracy can be produced with excellent productivity. In addition, scattered particles are prevented from penetrating into an undesirable portion of the production apparatus for the three-dimensionally shaped article 10 or adhering thereto, and therefore, the occurrence of a problem in the apparatus can be effectively prevented, and thus, the stability of production of the three-dimensionally shaped article 10 can be made excellent. Further, since scattering of the particles can be prevented, the three-dimensionally shaped article 10 can be safely produced.

In the case where the composition 11 contains a solvent as described in detail later, the solvent can be efficiently removed from the layer 1 by suction through the pores 811. In the related art, in the case where a composition containing particles and a solvent is used as a layer forming composition, it is difficult to sufficiently remove the solvent from the inside of the layer of the composition, and therefore, the mechanical strength or dimensional accuracy of a three-dimensionally shaped article cannot be made sufficiently excellent. In addition, in order to sufficiently decrease the content of the solvent in the layer, the heating time is sometimes increased, however, in such a case, the productivity of a three-dimensionally shaped article is significantly decreased. Further, in the related art, in the case where a composition containing particles and a solvent is used as the layer forming composition, the solvent often remains also in the finally obtained three-dimensionally shaped article at a relatively high content, and this causes a decrease in the durability or reliability of the three-dimensionally shaped article. On the other hand, according to the invention, even in the case where a composition containing a solvent is used as the layer forming composition, the occurrence of problems as described above can be reliably prevented. Accordingly, the effect of the invention is more remarkably exhibited in the case where the layer forming composition contains particles and a solvent.

Hereinafter, the respective steps will be described.

Layer Forming Step

In the layer forming step, a layer 1 having a given thickness is formed using a composition containing particles (layer forming composition) 11 (FIGS. 1A and 1D).

Since the composition 11 contains particles, the mechanical strength and the like of the finally obtained three-dimensionally shaped article 10 can be made excellent.

The composition (layer forming composition) 11 will be described in detail later.

In this step, by using a flattening unit, the layer 1 is formed such that the surface is flattened.

In the first layer forming step, the layer 1 is formed to a given thickness on the surface of a three-dimensionally shaped article production member 8 placed on a stage 41 (FIG. 1A). At this time, the side surface of the three-dimensionally shaped article production member 8 and a side surface support section 45 are in a close contact (abutment) state, so that the composition 11 is prevented from falling between the three-dimensionally shaped article production member 8 and the side surface support section 45.

In each of the second and following layer forming steps, a new layer 1 (second layer) is formed on the surface of the layer 1 (first layer) formed in the previous step (FIG. 1D). At this time, the side surface of the layer 1 on the three-dimensionally shaped article production member 8 (in the case where a plurality of layers 1 are present on the three-dimensionally shaped article production member 8, at least the layer 1 provided on the uppermost side) and the side surface support section 45 are in a close contact (abutment) state, so that the composition 11 is prevented from falling between the three-dimensionally shaped article production member 8 and the layer 1 on the three-dimensionally shaped article production member 8.

As described above, in the three-dimensionally shaped article production method of this embodiment, in a series of these steps to be performed repeatedly, the layer 1 is sucked toward the stage 41 side through the pores 811. The suction of the layer 1 may be performed in at least some steps in a series of these steps, however, by performing the suction of the layer 1 in the layer forming step, effects as described below are obtained.

That is, the layer forming step is a step involving a particularly large movement of the layer forming composition 11 containing particles in a series of these steps to be performed repeatedly, and the particles are liable to be scattered in this step. However, by sucking the layer 1 toward the stage 41 side in this step, scattering of the particles (powder) in the entire production process for the three-dimensionally shaped article 10 can be more effectively prevented, and the effect of the invention as described above can be more remarkably exhibited.

Further, for example, in the case where the layer forming composition 11 contains a solvent, by sucking the layer 1 toward the stage 41 side in this step, the solvent can be favorably removed in this step. Therefore, it is not necessary to additionally provide a step of removing the solvent from the layer 1 prior to the below-mentioned binding solution application step and bonded part forming step, or even if a step of removing the solvent from the layer 1 is provided, the time required for this step can be decreased. As a result, the productivity of the three-dimensionally shaped article 10 can be made particularly excellent while having the effect of using the composition 11 containing the solvent.

The three-dimensionally shaped article production member 8 may be any as long as it has the pores 811 through which the layer 1 can be sucked, but is constituted by a porous material in this embodiment.

According to this, the three-dimensionally shaped article production member 8 can be easily and reliably obtained as a member having the pores (holes) 811 with an appropriate size. Further, the pores 811 can be easily and reliably prevented from undesirably unevenly existing in the three-dimensionally shaped article production member 8.

The average pore diameter (hole diameter) of the pores 811 of the three-dimensionally shaped article production member 8 is preferably 0.1 μm or more and 100 μm or less, more preferably 0.1 μm or more and 20 μm or less.

According to this, the suction of the layer 1 through the pores 811 can be more favorably performed. Further, the ease of cleaning or washing, durability, and the like of the three-dimensionally shaped article production member 8 can be made particularly excellent. In addition, the three-dimensionally shaped article production member 8 can be easily and reliably produced by a sintering method or the like.

In this embodiment, the three-dimensionally shaped article production member 8 includes a first portion 81 which has the pores 811 and a second portion 82 which does not have the pores 811 or has the pores 811 which are sealed.

According to this, the three-dimensionally shaped article production member 8 can be favorably adsorbed onto the stage 41 by suction, and for example, an undesirable positional displacement or the like of the three-dimensionally shaped article production member 8 in the production process for the three-dimensionally shaped article 10 can be more effectively prevented, and thus, the stability of the production of the three-dimensionally shaped article 10 can be made particularly excellent.

In this embodiment, the second portion 82 is provided in a region which does not overlap with a portion constituting a tangible part (bonded part 13) of the three-dimensionally shaped article 10 in the layer 1 when the layer 1 is viewed in plan view.

According to this, a portion which has a large effect on the dimensional accuracy of the three-dimensionally shaped article 10 in the layer 1 can be favorable sucked, and thus, the dimensional accuracy of the finally obtained three-dimensionally shaped article 10 can be made higher. Further, in the case where the layer forming composition 11 contains a solvent, the solvent can be efficiently removed from the inside of the layer 1, and the reliability of the bonded part 13 to be formed in the subsequent step can be made particularly excellent, and also the mechanical strength of the three-dimensionally shaped article 10 can be made particularly excellent. In addition, the productivity of the three-dimensionally shaped article 10 can be made more excellent.

As shown in FIG. 2, the second portion 82 is provided near the outer periphery of the surface on which the layer 1 is formed.

According to tis, a region where the tangible part (bonded part 13) of the three-dimensionally shaped article 10 can be made sufficiently large, and a large three-dimensionally shaped article 10 can be favorably produced. Further, an effect that more three-dimensionally shaped articles 10 can be simultaneously produced and the like are obtained. In addition, the three-dimensionally shaped articles 10 in various shapes can be favorably produced without being excessively limited by the shape of the three-dimensionally shaped article 10 to be produced. Further, the three-dimensionally shaped article production member 8 can be more favorably adsorbed onto the stage 41, an undesirable positional displacement or the like of the three-dimensionally shaped article production member 8 in the production process for the three-dimensionally shaped article 10 can be more effectively prevented, and thus, the stability of the production of the three-dimensionally shaped article 10 and the dimensional accuracy, reliability, and the like of the three-dimensionally shaped article 10 to be produced can be made particularly excellent.

As described above, the second portion 82 is provided near the outer periphery, but is preferably provided in a region within 0.2×L (mm), more preferably in a region within 0.1×L (mm) from the outer periphery of the three-dimensionally shaped article production member 8 when the length (width) of the surface on which the layer 1 is formed is represented by L (mm).

According to this, the effect as described above is more remarkably exhibited.

In the structure shown in the drawing, the three-dimensionally shaped article production member 8 has a plurality of second portions 82, but may have only one second portion 82. Further, in the structure shown in the drawing, the second portion 82 is provided in the form of a dot, however, the form of the second portion 82 is not particularly limited, and may be provided in the form of, for example, a frame.

The porosity in the first portion 81 of the three-dimensionally shaped article production member 8 is preferably 5% by volume or more and 50% by volume or less, more preferably 10% by volume or more and 30% by volume or less.

According to this, the suction of the layer 1 through the pores 811 can be more favorably performed. Further, the ease of cleaning or washing, durability, and the like of the three-dimensionally shaped article production member 8 can be made particularly excellent. In addition, the three-dimensionally shaped article production member 8 can be easily and reliably produced by a sintering method or the like.

The three-dimensionally shaped article production member 8 may be in any form, but is in the form of a plate in this embodiment.

According to this, the three-dimensionally shaped article production member 8 can be stably placed on the stage 41, and the handleability of the three-dimensionally shaped article production member 8 becomes particularly excellent.

The thickness of the three-dimensionally shaped article production member (shaping plate) 8 (the thickness in the stacking direction of the layer 1) is preferably 0.5 mm or more and 10 mm or less, more preferably 2 mm or more and 5 mm or less.

According to this, the shape stability of the three-dimensionally shaped article production member 8 is made more excellent and the handleability of the three-dimensionally shaped article production member 8 can be made further more excellent while keeping the weight of the three-dimensionally shaped article production member 8 low.

The three-dimensionally shaped article production member 8 is preferably constituted by a material with a high strength. Examples of the constituent material of the three-dimensionally shaped article production member 8 include various metal materials such as stainless steel and various ceramic materials. Further, by constituting the three-dimensionally shaped article production member 8 by a sintered body of particles constituted by a metal material or a ceramic material, for example, the three-dimensionally shaped article production member 8 can be preferably produced as a member including a portion constituted by a porous body having the pores 811 as described above. When the three-dimensionally shaped article production member 8 includes a portion constituted by a sintered body of particles constituted by a metal material or a ceramic material, the strength, heat resistance, durability, weight reduction, and the like of the three-dimensionally shaped article production member 8 can be made particularly excellent. Further, the shape stability and handleability thereof also become excellent, and thus, it is also possible to favorably transfer the member in a state where a stacked body obtained by staking a plurality of layers 1 is placed thereon. The three-dimensionally shaped article production member 8 may be provided with a gripper capable of pulling out from the side of the member 8 or a mounting member capable of mounting the gripper. According to this, the transfer of the member can be further facilitated.

The surface (including the internal surface of the pore 811) of the three-dimensionally shaped article production member 8 may be subjected to a surface treatment. By doing this, for example, the adhesion of the constituent material of the composition 11 or the constituent material of the binding solution 12 to the three-dimensionally shaped article production member 8 is more effectively prevented, and the durability of the three-dimensionally shaped article production member 8 is made more excellent, and thus, the stable production of the three-dimensionally shaped article 10 can be achieved for a longer period of time. Examples of a material to be used for the surface treatment of the surface of the three-dimensionally shaped article production member 8 include fluororesins such as polytetrafluoroethylene.

The size (diameter) of the pore 811 is preferably smaller than that of the particle constituting the layer 1, however, by using a combination enabling at least 95% filtration because of a bridge phenomenon, a sufficient effect is exhibited.

A gas sucked through the pores 811 is discharged to the outside through pores 411 provided in the stage 41.

In this manner, by including the pores 411 in the stage 41, a gas can be discharged smoothly, and the adjustment of the suction power for the layer 1 can be favorably adjusted. Further, the three-dimensionally shaped article production member 8 can be favorably adsorbed onto the stage 41 by the suction, and for example, an undesirable positional displacement or the like of the three-dimensionally shaped article production member 8 in the production process for the three-dimensionally shaped article 10 can be more effectively prevented, and thus, the stability of the production of the three-dimensionally shaped article 10 can be made particularly excellent.

The viscosity (a value measured using an E-type viscometer (for example, VISCONIC ELD, manufactured by Tokyo Keiki, Inc. or the like)) of the composition 11 in this step is preferably 500 mPa·s or more and 60000 mPa·s or less, more preferably 1000 mPa·s or more and 20000 mPa·s or less. According to this, the occurrence of an undesirable variation in the film thickness of the layer 1 to be formed can be more effectively prevented.

The thickness of the layer 1 to be formed in this step is not particularly limited, but, for example, it is preferably 5 μm or more and 500 μm or less, more preferably 10 μm or more and 100 μm or less.

According to this, while making the productivity of the three-dimensionally shaped article 10 sufficiently excellent, the occurrence of undesirable irregularities or the like in the three-dimensionally shaped article 10 to be produced is more effectively prevented, and the dimensional accuracy of the three-dimensionally shaped article 10 can be made more excellent.

Binding Solution Application Step

Figure 1E:
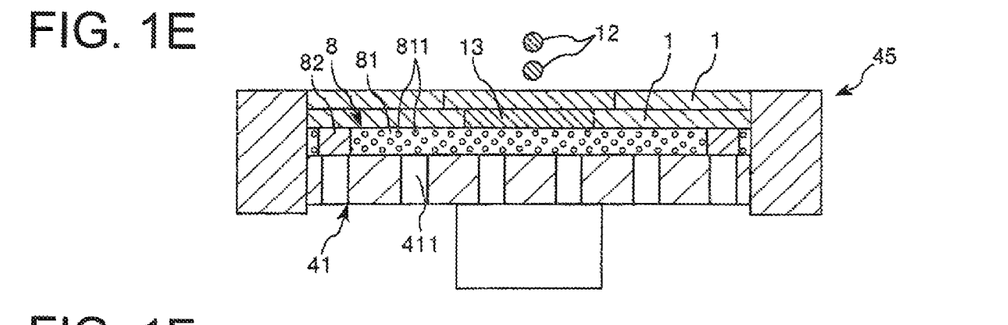

Subsequently, a binding solution 12 for bonding the particles constituting the layer 1 is applied to the layer 1 (FIGS. 1B and 1E).

In this step, the binding solution 12 is selectively applied only to a portion corresponding to a tangible part (a portion where a tangible body is present) of the three-dimensionally shaped article 10 in the layer 1.

By doing this, the particles constituting the layer 1 are strongly bonded to one another, whereby a bonded part (cured part) 13 having a desired shape can be formed in the end. Further, the mechanical strength of the finally obtained three-dimensionally shaped article 10 can be made excellent.

By forming the bonded part 13 using the binding solution 12, the energy amount required for forming the bonded part 13 can be decreased.

In this embodiment, the application of the binding solution 12 to the layer 1 is performed by an inkjet method.

According to this, even if the application pattern of the binding solution 12 has a finer shape, the binding solution 12 can be applied with high reproducibility. As a result, the dimensional accuracy of the finally obtained three-dimensionally shaped article 10 can be made higher.

The binding solution 12 may be any as long as it contains a bonding agent having a function to bond the particles, however, in this embodiment, the binding solution 12 contains a curable resin as the bonding agent and particularly preferably contains a photocurable resin (particularly a UV-curable resin) as the bonding agent.

According to this, the mechanical strength of the finally obtained three-dimensionally shaped article 10 and the productivity of the three-dimensionally shaped article 10 can be made more excellent. Further, this is advantageous also from the viewpoint of the storage stability of the binding solution 12 and the production cost of the three-dimensionally shaped article 10.

The binding solution 12 will be described in detail later.

As described above, the suction of the layer 1 may be performed in at least some steps in a series of these steps, however, by performing the suction of the layer 1 in the binding solution application step, effects as described below are obtained.

That is, in the binding solution application step, it is necessary to make the binding solution 12 to sufficiently permeate in the thickness direction of the layer 1 (spaces among the particles constituting the layer 1), however, by performing suction in this step, not only scattering of the particles constituting the layer 1 is prevented, but also permeation of the binding solution 12 into the layer 1 is promoted. As a result, the productivity of the three-dimensionally shaped article 10 can be made more excellent. It is also possible to more effectively prevent a problem (for example, a decrease in the mechanical strength of the three-dimensionally shaped article 10, a decrease in the dimensional accuracy thereof, etc.) caused by insufficient permeation of the binding solution into the layer 1, and thus, the reliability of the three-dimensionally shaped article 10 to be produced can be made higher.

In particular, the binding solution 12 contains a photocurable resin, and by performing suction when the binding solution 12 is applied, effects as described below are obtained.

That is, as described above, by performing suction in this step, not only scattering of the particles constituting the layer 1 is prevented, but also permeation of the binding solution 12 into the layer 1 can be promoted. In addition, when the binding solution 12 contains a photocurable resin as the bonding agent, by adjusting the timing of light irradiation, the timing of curing of the photocurable resin in the subsequent curing step can be easily adjusted. Accordingly, while promoting the permeation of the binding solution 12 into the layer 1, excessive wet-spreading of the binding solution in the layer 1 is more effectively prevented, and the bonded part 13 having a desired shape can be easily and reliably formed in the subsequent curing step.

Curing Step (Bonded Part Forming Step)

Figure 1F:
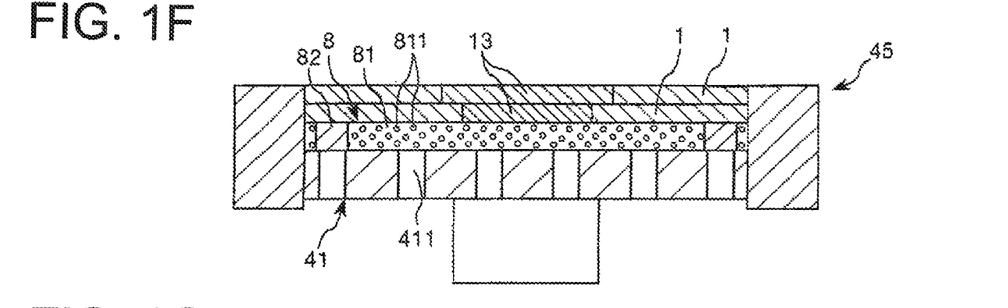
Figure 1G:
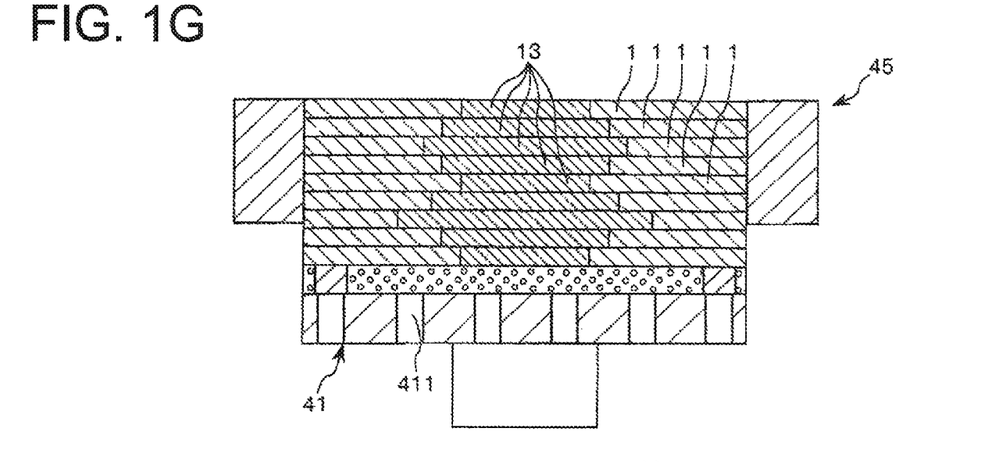
Figure 1H:
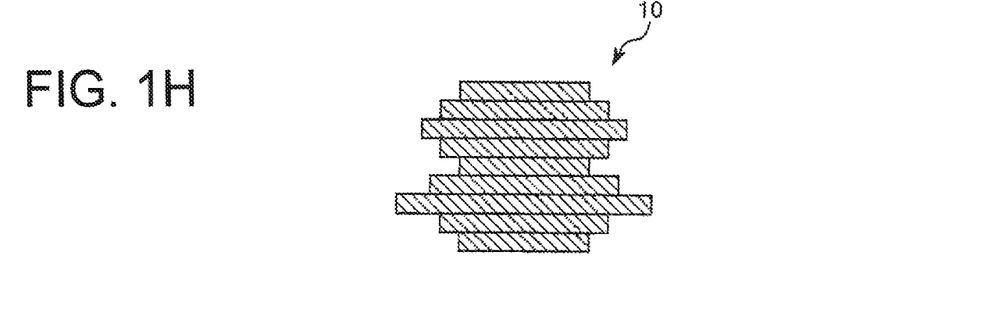

After the binding solution 12 is applied to the layer 1 in the binding solution application step, the bonding agent contained in the binding solution 12 applied to the layer 1 is cured, whereby a cured part (bonded part) 13 is formed (FIGS. 1C and 1F).

In this embodiment, the binding solution 12 contains a curable resin (polymerizable compound) as the bonding agent, and by performing a treatment according to the type of the curable resin or the like in this step, the cured part (bonded part) 13 is formed. For example, in the case where the curable resin (polymerizable compound) is a thermosetting polymerizable compound (thermosetting resin), curing can be performed by heating, and in the case where the curable resin (polymerizable compound) is a photocurable polymerizable compound (photocurable resin), curing can be performed by light irradiation.

The binding solution application step and the curing step may be performed simultaneously. That is, before forming the entire pattern of the entire one layer 1, the curing reaction may be allowed to sequentially proceed from a portion to which the binding solution 12 is applied.

The suction conditions may be changed appropriately.

For example, the suction power may be adjusted according to the number (stacking number) of the layers 1 formed on the three-dimensionally shaped article production member 8. More specifically, for example, in the case where the number of the layers 1 formed on the three-dimensionally shaped article production member 8 is large, the suction power through the pores 811 provided in the three-dimensionally shaped article production member 8 may be increased as compared with the case where the number of the layers 1 formed on the three-dimensionally shaped article production member is small. According to this, the suction power applied to the layer 1 provided on the uppermost surface is effectively prevented from varying depending on the number (stacking number) of the layers 1 formed on the three-dimensionally shaped article production member 8. As a result, the suction of the layer 1 can be performed under stable conditions regardless of the stacking number. Even in the case where a plurality of layers 1 are stacked, the suction through the pores 811 can be stably performed because of the presence of spaces among the particles contained in the layer 1.

In the case where the suction of the layer 1 is performed in the layer forming step and the binding solution application step, the suction power when the binding solution is applied to the layer 1 (in the binding solution application step) is preferably lower than when the layer 1 is formed (in the layer forming step).

According to this, scattering of the particles (powder) in the entire production process for the three-dimensionally shaped article 10 can be more effectively prevented, and also undesirable deformation of the layer 1 is more effectively prevented so that the bonded part 13 can be more reliably formed to have a desired shape, and thus, the dimensional accuracy and the like of the finally obtained three-dimensionally shaped article 10 can be made more excellent.

Unbonded Particle Removal Step

Then, a series of these steps as described above is performed repeatedly (FIG. 1G), and thereafter, as a posttreatment step, an unbonded particle removal step (FIG. 1H) in which among the particles constituting the respective layers 1, the particles which are not bonded to one another by the bonding agent (unbonded particles) are removed is performed. By doing this, the three-dimensionally shaped article 10 is taken out.

Examples of a specific method of this step include a method in which the unbonded particles are removed by brushing with a brush or the like, a method in which the unbonded particles are removed by suction, a method in which a gas such as air is blown, a method in which a liquid such as water is applied (for example, a method in which a stacked body obtained as described above is soaked in a liquid, a method in which a liquid is sprayed, etc.), and a method in which vibration such as ultrasonic vibration is applied. Further, two or more methods selected from these methods can be performed in combination. More specifically, a method in which a gas such as air is blown to the stacked body, and thereafter, the stacked body is soaked in a liquid such as water, a method in which ultrasonic vibration is applied to the stacked body while soaking the stacked body in a liquid such as water, and the like can be exemplified. Above all, it is preferred to adopt a method in which a liquid containing water is applied to the stacked body obtained as described above (particularly, a method in which the stacked body is soaked in a liquid containing water).

In this embodiment, the layer 1 is not formed in contact with the stage 41, but is formed in contact with the three-dimensionally shaped article production member 8 placed on the stage 41 and stacked, and therefore, a stacked body obtained by repeating a series of these steps can be favorably transferred in a state where the stacked body is placed on the three-dimensionally shaped article production member 8. Due to this, the unbonded particle removal step can be performed in a state where the stacked body is transferred to a suitable place. Further, the three-dimensionally shaped article production member 8 has the pores (holes) 811, and therefore, in the case where the member is soaked in a liquid such as water, the liquid such as water can come in contact with the three-dimensionally shaped article 10 also through the pores (holes) 811 in the other surface communicating with the contact surface with the layer 1, and thus, the three-dimensionally shaped article 10 can be separated from the three-dimensionally shaped article production member 8 without being damaged. Accordingly, the workability in the unbonded particle removal step can be made excellent, and the productivity of the three-dimensionally shaped article 10 can be made particularly excellent.

According to the production method according to the invention as described above, a three-dimensionally shaped article with excellent dimensional accuracy can be produced with excellent productivity and excellent stability.

Three-Dimensionally Shaped Article Production Apparatus

Next, the three-dimensionally shaped article production apparatus according to the invention will be described.

Figure 3:
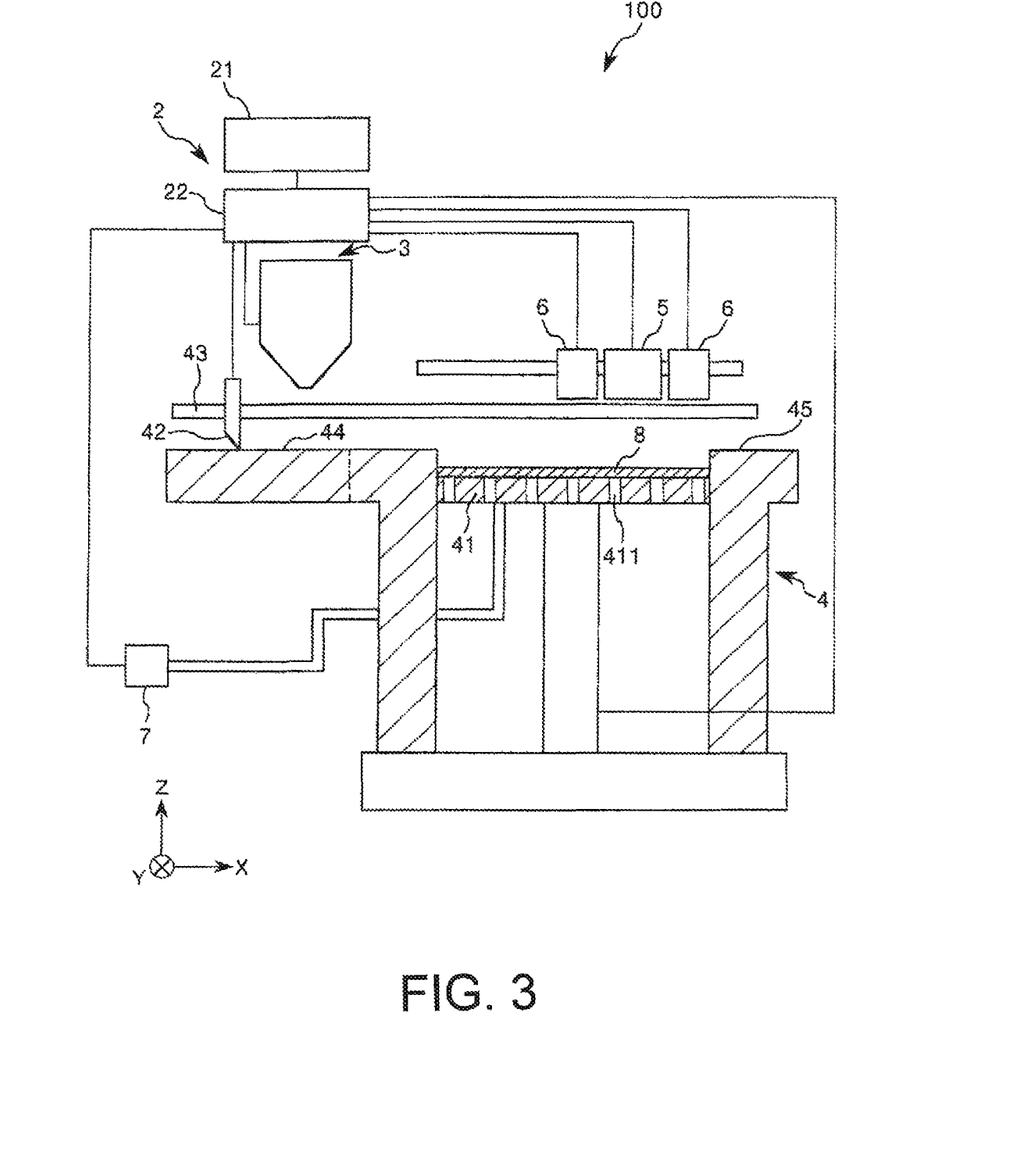
FIG. 3 is a cross-sectional view schematically showing a preferred embodiment of a three-dimensionally shaped article production apparatus according to the invention.

FIG. 3 is a cross-sectional view schematically showing a preferred embodiment of the three-dimensionally shaped article production apparatus according to the invention.

A three-dimensionally shaped article production apparatus 100 produces a three-dimensionally shaped article 10 by repeatedly forming a layer 1 using a composition containing particles (layer forming composition) 11, and stacking the formed layers 1.

The three-dimensionally shaped article production apparatus 100 of this embodiment includes a control section 2, a composition supply section (layer forming composition supply section) 3 which stores the composition containing particles (layer forming composition) 11, a three-dimensionally shaped article production member 8 having pores 811, a layer forming section 4 which forms the layer 1 using the composition 11 supplied from the composition supply section 3, a binding solution ejection section (binding solution application unit) 5 which ejects the binding solution 12 to the layer 1, a UV irradiation unit (curing unit) 6 which irradiates a UV light for curing the binding solution 12, and a suction unit 7 which sucks the layer 1 through the pore 811.

The control section 2 includes a computer 21 and a drive control section 22.

The computer 21 is a common desk top computer or the like configured to include a CPU, a memory, etc. therein. The computer 21 digitizes the shape of the three-dimensionally shaped article 10 as model data, and outputs cross-sectional data (slice data) obtained by slicing the three-dimensionally shaped article 10 into a plurality of parallel layers of thin cross sections to the drive control section 22.

The drive control section 22 functions as a control unit for individually driving the layer forming section 4, the binding solution ejection section 5, the UV irradiation unit 6, the suction unit 7, and the like. Specifically, for example, the drive control section 22 controls the ejection pattern and the ejection amount of the binding solution 12 by the binding solution ejection section 5, the supply amount of the composition 11 from the composition supply section 3, the descent amount of a stage 41, the conditions of suction (a suction power, a portion to be sucked, etc.) by the suction unit 7, and the like.

The composition supply section 3 is configured to move under the command of the drive control section 22 and supply the composition 11 stored therein to a composition temporary placing section 44.

The three-dimensionally shaped article production member 8 is a member, on the surface of which the layer 1 is formed and stacked, and has the pores 811. The member is configured to be able to suck the layer 1 through the pores 811.

It is preferred that the three-dimensionally shaped article production member 8 satisfy the above-mentioned conditions.

Further, the three-dimensionally shaped article production member 8 is placed on the stage 41 when the layer 1 is formed, but is preferably separable (detachable) from the stage 41.

According to this, when an unnecessary portion (a portion where a bonded part 13 is not formed) is removed from a stacked body obtained by stacking a plurality of layers 1, the stacked body can be transferred to another place in a state where the stacked body is placed on the three-dimensionally shaped article production member 8. According to this, the removal of the unnecessary portion can be performed with excellent workability, and thus, the productivity of the three-dimensionally shaped article 10 can be made particularly excellent.

The layer forming section 4 includes the composition temporary placing section 44 which temporarily holds the composition 11 supplied from the composition supply section 3, a squeegee (flattening unit) 42 which forms a layer 1 while flattening the composition 11 held by the composition temporary placing section 44, a guide rail 43 which regulates the movement of the squeegee 42, the three-dimensionally shaped article production member 8, the stage 41 which supports the layer 1 formed on the three-dimensionally shaped article production member 8, and a side surface support section (frame body) 45 which surrounds the stage 41 and the three-dimensionally shaped article production member 8.

When a new layer 1 is formed on a previously formed layer 1, the previously formed layer 1 is moved relatively downward with respect to the side surface support section (frame body) 45. By doing this, the thickness of the newly formed layer 1 is defined.

In particular, in this embodiment, when a new layer 1 is formed on a previously formed layer 1, the stage 41 sequentially descends by a given amount under the command of the drive control section 22. In this manner, since the stage 41 is configured to be able to move in the Z direction (vertical direction), the number of members to be moved for adjusting the thickness of the layer 1 when the new layer 1 is formed can be decreased, and therefore, the structure of the three-dimensionally shaped article production apparatus 100 can be further simplified.

The stage 41 has a flat surface (a portion to which the composition 11 is applied).

According to this, the layer 1 having a highly uniform thickness can be easily and reliably formed. Further, in the three-dimensionally shaped article 10 to be produced, the occurrence of undesirable deformation or the like can be effectively prevented.

The stage 41 is provided with pores 411 penetrating through the stage 41 in the thickness direction. The pores 411 are connected to the pores 811 provided in the three-dimensionally shaped article production member 8, and a gas sucked from the layer 1 is discharged to the outside through the pores 411.

The size (width) of the pore 411 is preferably larger than that of the pore 811 provided in the three-dimensionally shaped article production member 8.

According to this, the suction from the layer 1 can be favorably performed while reducing the load imposed on the suction unit 7. Further, the three-dimensionally shaped article production member 8 can be more favorably adsorbed onto the stage 41.

The width (in the case where the planar shape of the pore 411 is a circle, the diameter) of the pore 411 is preferably 0.1 mm or more and 10 mm or less, more preferably 0.5 mm or more and 3 mm or less.

According to this, the effect as described above is more remarkably exhibited. Further, in the case where the pores 411 are formed by machine processing, the ease of the processing can be made particularly excellent.

In the structure shown in the drawing, the pore 411 is provided linearly in the thickness direction of the stage 41 (the normal direction of the layer 1), but may have, for example, a bent part or a curved part. Further, the pore 411 penetrates through the stage in the thickness direction thereof, but may, for example, open to the side surface of the stage 41.

Further, the stage 41 may be constituted by a porous material. Also in such a case, the stage 41 can be configured to have the pores 411.

Further, the stage 41 preferably has the pores 411 at least in a portion which overlaps with the pores 811 provided in the first portion 81 of the three-dimensionally shaped article production member 8 when viewed in plan view from the normal direction of the layer 1 and in the second portion 82 (a portion in which the pores 811 are not provided).

According to this, the suction of the layer 1 can be favorably performed while favorably adsorbing the three-dimensionally shaped article production member 8 onto the stage 41.

The pore 411 may have any shape, and examples of the shape thereof when viewed in plan view from the normal direction of the layer 1 include a circle, an ellipse, a polygon such as a quadrangle, and an L shape.

The stage 41 is preferably constituted by a material with a high strength. Examples of the constituent material of the stage 41 include various metal materials such as stainless steel.

Further, the surface (including the internal surface of the pore 411) of the stage 41 may be subjected to a surface treatment. By doing this, for example, the adhesion of the constituent material of the composition 11 or the constituent material of the binding solution 12 to the stage 41 is more effectively prevented, and the durability of the stage 41 is made more excellent, and thus, the stable production of the three-dimensionally shaped article 10 can be achieved for a longer period of time. Examples of a material to be used for the surface treatment of the surface of the stage 41 include fluororesins such as polytetrafluoroethylene.

The squeegee 42 has an elongated shape extending in the Y direction and includes a blade having the shape of a tapered or rounded edge at a lower tip end.

The length of the blade in the Y direction is equal to or longer than the width (the length in the Y direction) of the three-dimensionally shaped article production member 8 (shaping region).

The three-dimensionally shaped article production apparatus 100 may include a vibration mechanism (not shown) for giving small vibration to the blade so as to smoothly diffuse the composition 11 with the squeegee 42.

The side surface support section (frame body) 45 has a function to support the side surface of the layer 1 formed on the three-dimensionally shaped article production member 8. The side surface support section 45 also has a function to define the area of the layer 1 when forming the layer 1.

The side surface support section 45 is preferably constituted by a material with a high strength. Examples of the constituent material of the side surface support section 45 include various metal materials such as stainless steel.

Further, the surface (a portion which can come in contact with the composition 11) of the side surface support section 45 may be subjected to a surface treatment. By doing this, for example, the adhesion of the constituent material of the composition 11 or the constituent material of the binding solution 12 to the side surface support section 45 is more effectively prevented, and the durability of the side surface support section 45 is made more excellent, and thus, the stable production of the three-dimensionally shaped article 10 can be achieved for a longer period of time. Further, when the previously formed layer 1 is moved relatively downward with respect to the side surface support section 45, the occurrence of an undesirable disturbance of the layer 1 can be effectively prevented. As a result, the dimensional accuracy and reliability of the finally obtained shaped article 10 can be made more excellent. Examples of a material to be used for the surface treatment of the surface of the side surface support section 45 include fluororesins such as polytetrafluoroethylene.

The binding solution application unit (binding solution ejection section) 5 applies the binding solution 12 supplied from the binding solution storage section (not shown) to the layer 1.

The binding solution ejection section (binding solution application unit) 5 is configured such that the application pattern of the binding solution 12 or the like is controlled according to the pattern to be formed for each layer 1 under the command of the drive control section 22.

In this embodiment, the binding solution application unit 5 is a binding solution ejection section which ejects the binding solution 12 by an inkjet method.

According to this, the binding solution 12 can be applied in a fine pattern, and even if the three-dimensionally shaped article 10 has a fine structure, the three-dimensionally shaped article 10 can be produced with higher productivity.

As a liquid droplet ejection system (a system of the inkjet method), a piezo system, a system for ejecting the binding solution 12 by a bubble generated by heating the binding solution 12, or the like can be used, however, from the viewpoint that the constituent components of the binding solution 12 are hardly denatured, and the like, a piezo system is preferred.

The UV irradiation unit (curing unit) 6 irradiates a UV light for curing the binding solution 12 applied to the layer 1.

The suction unit 7 has a function to suck the layer 1 so as to bring the layer 1 into close contact with the three-dimensionally shaped article production member 8 or so as to bring the layer 1 into close contact with a layer 1 provided closer to the three-dimensionally shaped article production member 8 than the layer 1.

As the suction unit 7, for example, any of various pumps can be used.

According to the three-dimensionally shaped article production apparatus according to the invention as described above, a three-dimensionally shaped article with excellent dimensional accuracy can be produced with excellent productivity and excellent stability.

Composition (Layer Forming Composition)

Next, the composition (layer forming composition) to be used for producing the three-dimensionally shaped article according to the invention will be described in detail.

The composition (layer forming composition) 11 contains a powder for three-dimensional shaping containing at least a plurality of particles.

Powder (Particles) for Three-Dimensional Shaping

Examples of a constituent material of the particles constituting the powder for three-dimensional shaping include an inorganic material, an organic material, and a composite of these materials.

Examples of the inorganic material constituting the particles include various metals and metal compounds. Examples of the metal compounds include various metal oxides such as silica, alumina, titanium oxide, zinc oxide, zirconium oxide, tin oxide, magnesium oxide, and potassium titanate; various metal hydroxides such as magnesium hydroxide, aluminum hydroxide, and calcium hydroxide; various metal nitrides such as silicon nitride, titanium nitride, and aluminum nitride; various metal carbides such as silicon carbide and titanium carbide; various metal sulfides such as zinc sulfide; various metal carbonates such as calcium carbonate and magnesium carbonate; various metal sulfates such as calcium sulfate and magnesium sulfate; various metal silicates such as calcium silicate and magnesium silicate; various metal phosphates such as calcium phosphate; various metal borates such as aluminum borate and magnesium borate; and composites of these materials.

Examples of the organic material constituting the particles include synthetic resins and natural polymers, and more specific examples thereof include a polyethylene resin; polypropylene; polyethylene oxide; polypropylene oxide; polyethylenimine; polystyrene; polyurethane; polyurea; polyester; a silicone resin; an acrylic silicone resin; a polymer containing a (meth)acrylate ester as a constituent monomer such as poly(methyl methacrylate); a crosspolymer (an ethylene acrylic acid copolymer resin or the like) containing a (meth)acrylate ester as a constituent monomer such as a methyl methacrylate crosspolymer; polyamide resins such as nylon 12, nylon 6, and copolymer nylon; polyimide; carboxymethyl cellulose; gelatin; starch; chitin; and chitosan.

The particles may be subjected to a surface treatment such as a hydrophobization treatment.

The hydrophobization treatment performed for the particles may be any as long as it is a treatment for enhancing the hydrophobicity of the particles (base particles), but is preferably a treatment in which a hydrocarbon group is introduced.

According to this, the hydrophobicity of the particles can be made higher. Further, the uniformity of the degree of the hydrophobization treatment among individual particles and individual portions of the surface of the particle (in the case where the particle has a pore opening to the outside, including the internal surface of the pore) can be easily and reliably made higher.

A compound to be used in the hydrophobization treatment is preferably a silane compound containing a silyl group.

The average particle diameter of the particles is not particularly limited, but is preferably 1 µm or more and 25 µm or less, more preferably 1 µm or more and 15 µm or less.

According to this, the mechanical strength of the three-dimensionally shaped article 10 can be made more excellent, and also the occurrence of undesirable irregularities or the like in the three-dimensionally shaped article 10 to be produced is more effectively prevented, and the dimensional accuracy of the three-dimensionally shaped article 10 can be made more excellent. Further, the fluidity of the layer forming composition 11 can be made more excellent, and thus, the productivity of the three-dimensionally shaped article 10 can be made more excellent. In addition, even in the case where the number (stacking number) of the layers 1 formed on the three-dimensionally shaped article production member 8 is relatively large, the suction through the pores 811 can be more favorably performed.

The "average particle diameter" as used herein refers to an average particle diameter on a volume basis and can be determined by, for example, adding a sample to methanol, followed by dispersion for 3 minutes using an ultrasonic disperser, and then, measuring the resulting dispersion liquid using a particle size distribution analyzer employing a Coulter counter method (for example, model TA-II, manufactured by Coulter Electronics, Inc.) with an aperture of 50 µm.

The Dmax of the particles is preferably 3 µm or more and 40 µm or less, more preferably 5 µm or more and 30 µm or less.

According to this, the mechanical strength of the three-dimensionally shaped article 10 can be made more excellent, and also the occurrence of undesirable irregularities or the like in the three-dimensionally shaped article 10 to be produced is more effectively prevented, and the dimensional accuracy of the three-dimensionally shaped article 10 can be made more excellent. Further, the fluidity of the layer forming composition 11 can be made more excellent, and thus, the productivity of the three-dimensionally shaped article 10 can be made more excellent.

The particles may have any shape, but preferably have a spherical shape. According to this, the fluidity of the layer forming composition 11 can be made more excellent, and thus, the productivity of the three-dimensionally shaped article 10 can be made more excellent, and also the occurrence of undesirable irregularities or the like in the three-dimensionally shaped article 10 to be produced is more effectively prevented, and the dimensional accuracy of the three-dimensionally shaped article 10 can be made more excellent.

The layer forming composition 11 may contain a plurality of types of particles.

The content of the particles in the layer forming composition 11 is preferably 8% by mass or more and 100% by mass or less, more preferably 10% by mass or more and 100% by mass or less.

According to this, while making the fluidity of the layer forming composition 11 sufficiently excellent, the mechanical strength of the finally obtained three-dimensionally shaped article 10 can be made more excellent.

Solvent

The layer forming composition 11 may contain a solvent in addition to the particles.

According to this, for example, the layer forming composition 11 can be formed into a paste, and the fluidity of the layer forming composition 11 can be increased, and the workability when forming the layer 1 can be enhanced, and also the layer 1 with high surface flatness can be easily and reliably formed. Further, undesirable scattering or the like of the powder (particles) when forming the layer 1 or the like can be more effectively prevented. In the related art, in the case where a composition containing particles and a solvent is used as the layer forming composition, it is difficult to sufficiently remove the solvent from the inside of the layer of the composition, and therefore, the mechanical strength or dimensional accuracy of the three-dimensionally shaped article cannot be made sufficiently excellent. Further, the heating time is sometimes increased in order to sufficiently decrease the content of the solvent in the layer, however, in such a case, the productivity of a three-dimensionally shaped article is significantly decreased. Further, in the related art, in the case where a composition containing particles and a solvent is used as the layer forming composition, the solvent often remains also in the finally obtained three-dimensionally shaped article at a relatively high content, and this causes a decrease in the durability or reliability of the three-dimensionally shaped article. On the other hand, according to the invention, even in the case where a composition containing a solvent is used as the layer forming composition, the occurrence of problems as described above can be reliably prevented. Accordingly, the effect of the invention is more remarkably exhibited in the case where the layer forming composition contains particles and a solvent.

Further, particularly in the case where the layer forming composition 11 contains an aqueous solvent among various solvents, effects as described below are obtained.

That is, the aqueous solvent has high affinity for water, and therefore can favorably dissolve a water-soluble resin described later. Therefore, the fluidity of the layer forming composition 11 can be made favorable, and an undesirable variation in the thickness of the layer 1 to be formed using the layer forming composition 11 can be more effectively prevented. Further, when the layer 1 in a state where the aqueous solvent has been removed is formed, a water-soluble resin can be adhered to the particle with higher uniformity throughout the entire layer 1, and thus, the occurrence of undesirable unevenness of the composition can be more effectively prevented. Due to this, the occurrence of an undesirable variation in the mechanical strength among individual portions of the finally obtained three-dimensionally shaped article 10 can be more effectively prevented, and thus, the reliability of the three-dimensionally shaped article 10 can be made higher.

The "aqueous solvent" as used herein refers to water or a liquid having high affinity for water, however, specifically refers to a solvent having a solubility in 100 g of water at 25° C. of 50 g or more.

Examples of the aqueous solvent constituting the layer forming composition 11 include water; alcoholic solvents such as methanol, ethanol, and isopropanol; ketone-based solvents such as methyl ethyl ketone and acetone; glycol ether-based solvents such as ethylene glycol monoethyl ether and ethylene glycol monobutyl ether; glycol ether acetate-based solvents such as propylene glycol 1-monomethyl ether 2-acetate and propylene glycol 1-monoethyl ether 2-acetate; polyethylene glycol, and polypropylene glycol, and one solvent or a combination of two or more solvents selected from these can be used.

The content of the solvent in the layer forming composition 11 is preferably 1% by mass or more and 92% by mass or less, more preferably 2% by mass or more and 89% by mass or less.

According to this, the effect of including the solvent as described above is more remarkably exhibited, and also the solvent can be easily removed in a short time in the production process for the three-dimensionally shaped article 10, and thus, the productivity of the three-dimensionally shaped article 10 can be made more excellent. Further, spaces can be incorporated in the layer 1 in a state where the solvent has been removed at an appropriate ratio so that the permeability of the binding solution 12 can be made more excellent, and thus, the mechanical strength, dimensional accuracy, and the like of the finally obtained three-dimensionally shaped article 10 can be made more excellent.

Binder

The layer forming composition 11 may contain a binder.

According to this, a plurality of particles can be favorably bonded (temporarily fixed) to one another in the layer 1 formed using the layer forming composition 11, and thus, undesirable scattering or the like of the particles can be effectively prevented. As a result, the safety for workers and the dimensional accuracy of the three-dimensionally shaped article 10 to be produced can be further improved.

In the case where the layer forming composition 11 contains a solvent and a binder, the binder is preferably dissolved in the solvent in the layer forming composition 11.

According to this, the fluidity of the layer forming composition 11 can be made more favorable, and an undesirable variation in the thickness of the layer 1 to be formed using the layer forming composition 11 can be more effectively prevented. Further, when the layer 1 in a state where the solvent has been removed is formed, the binder can be adhered to the particles with higher uniformity throughout the entire layer 1, and thus, the occurrence of undesirable unevenness of the composition can be more effectively prevented. Due to this, the occurrence of an undesirable variation in the mechanical strength among individual portions of the finally obtained three-dimensionally shaped article 10 can be more effectively prevented, and thus, the reliability of the three-dimensionally shaped article 10 can be made higher.

The binder may be any as long as it has a function to temporarily fix a plurality of particles in the layer 1 formed using the layer forming composition 11, however, a water-soluble resin can be preferably used.

By including a water-soluble resin, in the case where the layer forming composition 11 contains an aqueous solvent (particularly water) as the solvent, the binder (water-soluble resin) can be included in the layer forming composition 11 in a dissolved state, and the fluidity and handleability (ease of handling) of the layer forming composition 11 can be made more excellent. As a result, the productivity of the three-dimensionally shaped article 10 can be made more excellent.

Further, a portion of the layer 1 to which the binding solution 12 is not applied in the production process for the three-dimensionally shaped article 10 can be easily and efficiently removed by applying an aqueous solvent (particularly water) thereto. As a result, the productivity of the three-dimensionally shaped article 10 can be made more excellent. Further, the portion of the layer 1 which should be removed can be easily and reliably prevented from adhering to or remaining in the finally obtained three-dimensionally shaped article 10, and thus, the dimensional accuracy of the three-dimensionally shaped article 10 can be made more excellent.

Hereinafter, the water-soluble resin as the binder will be mainly described.

The water-soluble resin may be any as long as it can be at least partially dissolved in an aqueous solvent, but is preferably, for example, a resin having a solubility in water (the mass of the resin that can be dissolved in 100 g of water) at 25° C. of 5 g/100 g of water or more, more preferably a resin having a solubility in water at 25° C. of 10 g/100 g of water or more.

Examples of the water-soluble resin include synthetic polymers such as polyvinyl alcohol (PVA), polyvinylpyrrolidone (PVP), polycaprolactone diol, sodium polyacrylate, ammonium polyacrylate, polyacrylamide, modified polyamide, polyethylenimine, polyethylene oxide, and a random copolymer of ethylene oxide and propylene oxide; natural polymers such as corn starch, mannan, pectin, agar, alginic acid, dextran, glue, and gelatin; and semisynthetic polymers such as carboxymethyl cellulose, hydroxyethyl cellulose, oxidized starch, and modified starch, and one material or a combination of two or more materials selected from these can be used.

Binding Solution

Next, the binding solution to be used for the production of the three-dimensionally shaped article 10 according to the invention will be described in detail.

The binding solution 12 contains at least a bonding agent.

Bonding Agent

The binding solution 12 contains at least a curable resin as the bonding agent.

Examples of the curable resin include a thermosetting resin; various photocurable resins such as a visible light curable resin which is cured by a light in the visible light range (a photocurable resin in a narrow sense), a UV curable resin, and an IR curable resin; and an X-ray curable resin, and one curable resin or a combination of two or more curable resins selected from these can be used. Above all, particularly, a UV curable resin (polymerizable compound) is preferred from the viewpoint of the mechanical strength of the three-dimensionally shaped article 10 to be obtained, the productivity of the three-dimensionally shaped article 10, the storage stability of the binding solution 12, and the like.

As the UV curable resin (polymerizable compound), a compound whose addition polymerization or ring-opening polymerization is initiated by a radical species, a cationic species, or the like generated from a photopolymerization initiator by UV irradiation, thereby forming a polymer is preferably used. Examples of the polymerization form of the addition polymerization include radical, cationic, anionic, metathesis, and coordination polymerization. Further, examples of the polymerization form of the ring-opening polymerization include cationic, anionic, radical, metathesis, and coordination polymerization.

Examples of an addition polymerizable compound include compounds having at least one ethylenically unsaturated double bond. As the addition polymerizable compound, a compound having at least one, preferably two or more terminal ethylenically unsaturated bonds can be preferably used.

An ethylenically unsaturated polymerizable compound has a chemical form of a monofunctional polymerizable compound, a polyfunctional polymerizable compound, or a mixture thereof. Examples of the monofunctional polymerizable compound include unsaturated carboxylic acids (for example, acrylic acid, methacrylic acid, itaconic acid, crotonic acid, isocrotonic acid, maleic acid, etc.) and esters thereof, and amides thereof. As the polyfunctional polymerizable compound, an ester of an unsaturated carboxylic acid with an aliphatic polyhydric alcohol compound or an amide of an unsaturated carboxylic acid with an aliphatic polyvalent amine compound is used.

Further, an addition reaction product of an ester or an amide of an unsaturated carboxylic acid having a hydroxyl group or a nucleophilic substituent such as an amino group or a mercapto group with an isocyanate or an epoxy, a dehydration condensation reaction product with a carboxylic acid, or the like can also be used. Further, an addition reaction product of an ester or an amide of an unsaturated carboxylic acid having an electrophilic substituent such as an isocyanate group or an epoxy group with an alcohol, an amine, or a thiol, further, a substitution reaction product of an ester or an amide of an unsaturated carboxylic acid having a leaving substituent such as a halogen group or a tosyloxy group with an alcohol, an amine, or a thiol can also be used.

As a specific example of the radical polymerizable compound which is the ester of an unsaturated carboxylic acid with an aliphatic polyhydric alcohol compound, for example, a (meth)acrylate ester is representative, and either a monofunctional (meth)acrylate or a polyfunctional (meth)acrylate can be used.

The content of the bonding agent in the binding solution 12 is preferably 80% by mass or more, more preferably 85% by mass or more. According to this, the mechanical strength of the finally obtained three-dimensionally shaped article 10 can be made particularly excellent.

Another Component

The binding solution 12 may contain a component other than the above-mentioned components. Examples of such a component include various coloring agents such as a pigment and a dye, a dispersant, a surfactant, a polymerization initiator, a polymerization accelerator, a solvent, a permeation accelerator, a wetting agent (humectant), a fixing agent, an antifungal agent, a preservative, an antioxidant, a UV absorber, a chelating agent, a pH adjusting agent, a thickening agent, a filler, an anti-aggregation agent, and a defoaming agent.

In the case where the binding solution 12 contains a pigment, the average particle diameter of the pigment is preferably 300 nm or less, more preferably 50 nm or more and 250 nm or less. According to this, the ejection stability of the binding solution 12 and the dispersion stability of the pigment in the binding solution 12 can be made more excellent, and also an image with higher image quality can be formed.

The binding solution 12 may contain a solvent. According to this, the viscosity of the binding solution 12 can be favorably adjusted, and even if the binding solution 12 contains a component with a high viscosity, the ejection stability of the binding solution 12 by an inkjet method can be made more excellent.

Examples of the solvent include (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetyl acetone; and alcohols such as ethanol, propanol, and butanol, and one solvent or a combination of two or more solvents selected from these can be used.

The viscosity of the binding solution 12 is preferably 1 mPa·s or more and 30 mPa·s or less, more preferably 3 mPa·s or more and 25 mPa·s or less. According to this, the ejection stability of the binding solution 12 by an inkjet method can be made more excellent. Incidentally, the "viscosity" as used herein refers to a value measured at 25° C. using an E-type viscometer (for example, VISCONIC ELD, manufactured by Tokyo Keiki, Inc. or the like) unless otherwise specified.

Three-Dimensionally Shaped Article

The three-dimensionally shaped article according to the invention can be produced using the production method and the production apparatus as described above.

According to this, a three-dimensionally shaped article with excellent dimensional accuracy can be provided.

The use of the three-dimensionally shaped article according to the invention is not particularly limited, however, examples of the use include ornaments and exhibits such as dolls and figures; and medical devices such as implants.

Further, the three-dimensionally shaped article according to the invention may be applied to any of prototypes, mass-produced products, and custom-made products.

Hereinabove, preferred embodiments of the invention have been described, however, the invention is not limited thereto.

For example, in the three-dimensionally shaped article production apparatus according to the invention, the configuration of each section can be replaced with an arbitrary configuration exhibiting a similar function, and also an arbitrary configuration can be added.

For example, in the above-mentioned embodiments, a configuration in which the stage is moved down has been representatively described, however, in the production method according to the invention, for example, the side surface support section may be configured to move up.

Further, a roller or the like may be used as the flattening unit in place of the squeegee as described above.

Further, the three-dimensionally shaped article production apparatus according to the invention may include a recovery mechanism (not shown) for recovering the composition which is not used for forming the layer in the composition supplied from the composition supply section. According to this, while preventing the accumulation of the excess composition in the layer forming section, a sufficient amount of the composition can be supplied, and therefore, while more effectively preventing the occurrence of defects in the layer, the three-dimensionally shaped article can be produced more stably. Further, the recovered composition can be used for producing the three-dimensionally shaped article again, and therefore, this can contribute to the reduction in the production cost of the three-dimensionally shaped article, so that this configuration is preferred also from the viewpoint of resource saving.

Further, the three-dimensionally shaped article production apparatus according to the invention may include a recovery mechanism for recovering the composition removed in the unbonded particle removal step.

Further, in the case where a material containing a solvent (for example, the layer forming composition, the binding solution, or the like) is used for producing the three-dimensionally shaped article, the three-dimensionally shaped article production apparatus according to the invention may include a solvent recovery unit for recovering the solvent removed from the layer. The solvent recovery unit can be disposed, for example, in a flow channel connected to the suction unit. As the solvent recovery unit, for example, a Dewar condenser, an Allihn condenser, a Graham condenser, a Dimroth condenser, a Liebig condenser, a Friedrichs condenser, a Hopkins condenser, a West condenser, a cold finger, or the like can be adopted.

Further, the three-dimensionally shaped article production apparatus may include, for example, a heating unit for heating the layer. According to this, for example, in the case where a material containing a solvent (for example, the layer forming composition, the binding solution, or the like) is used for producing the three-dimensionally shaped article, the fluidity of the solvent can be made more excellent so that the efficiency of removing the solvent can be made more excellent, and thus, the productivity of the three-dimensionally shaped article can be made more excellent. Further, the solvent can be more effectively prevented from undesirably remaining in the three-dimensionally shaped article to be produced, and thus, the reliability and the like of the three-dimensionally shaped article can be made more excellent.

Further, in the above-mentioned embodiments, a case where the three-dimensionally shaped article production member to be placed on the stage is constituted by a porous body, and the layer is sucked through the pores (continuous pores) of the porous body has been mainly described, however, the three-dimensionally shaped article production member may not be constituted by a porous body, and for example, may have pores provided linearly in the thickness direction. Such pores may be provided by, for example, machine processing.

Further, in the above-mentioned embodiments, a case where pores functioning as flow channels for a gas are provided in the stage has been representatively described, however, the stage may not have pores.

For example, a three-dimensionally shaped article production member having a larger area than the stage is used, and suction may be performed from a portion which is not in contact with the stage of the surface facing the stage of the three-dimensionally shaped article production member.

Further, in the above-mentioned embodiments, a case where the binding solution application step is performed by an inkjet method has been mainly described, however, the binding solution application step may be performed using another method (for example, another printing method).

Further, in the above-mentioned embodiments, a case where the flattening unit moves on the stage has been described, however, the flattening may be performed by moving the stage so as to change the positional relationship between the stage and the squeegee.

Further, the three-dimensionally shaped article production apparatus according to the invention may be any as long as it is configured such that the three-dimensionally shaped article production member having pores is used and the layer can be sucked through the pores, and may not have a configuration as described above. For example, the three-dimensionally shaped article production apparatus according to the invention may not include the binding solution application unit or the curing unit.

Further, in the above-mentioned embodiments, a case where the bonded part is formed in all the layers has been described, however, a layer in which the bonded part is not formed may be formed. For example, the bonded part is not formed in a layer formed immediately above the stage, and the layer may be made to function as a sacrifice layer.

Further, in the production method according to the invention, a pre-treatment step, an intermediate treatment step, or a post-treatment step may be performed as needed.

Examples of the pre-treatment step include a stage cleaning step.

Examples of the post-treatment step include a washing step, a shape adjustment step in which deburring or the like is performed, a coloring step, a coating layer forming step, and a bonding agent curing completion step in which a UV irradiation treatment for reliably curing the uncured bonding agent is performed.

Further, in the above-mentioned embodiments, a case where the binding solution contains a curable resin (polymerizable compound) has been mainly described, however, the binding solution may contain a thermoplastic resin in place of the curable resin (polymerizable compound). Even in such a case, the bonded part can be formed by converting the thermoplastic resin from a dissolved state to a solidified state, or by removing a solvent contained in the binding solution (a solvent for dissolving the thermoplastic resin) to convert the thermoplastic resin to a solidified state, or the like.

Further, in the above description, a case where the formation of the bonded part is performed using the binding solution has been mainly described, however, in the invention, the formation of the bonded part may be performed by any method, and may be performed by, for example, fusing (sintering, joining) the particles with irradiation with an energy light.

In such a method, in the related art, the temperature of a region irradiated with the energy light and a region therearound is increased, and therefore, a problem arises such that the dimensional accuracy is liable to be decreased due to the thermal expansion. However, according to the invention, gas flow can be generated accompanying the suction of the layer, and therefore, the temperature of a region irradiated with the energy light and a region therearound can be prevented from increasing. Further, even in the case where the temperature is increased to a relatively high level by the irradiation with the energy light, the material can be rapidly cooled. As a result, the dimensional accuracy of the finally obtained three-dimensionally shaped article can be reliably made excellent. Further, the time required for cooling can be decreased, and therefore, the productivity of the three-dimensionally shaped article can be made particularly excellent. The method in which the particles are fused (sintered, joined) by irradiation with an energy light has a problem that the temperature of a region irradiated with the energy light is rapidly increased when the energy light for fusing (sintering, joining) the particles is irradiated and the particles constituting the layer are liable to be scattered. However, according to the invention, the problem as described above can be reliably prevented.

In addition, even in the case where an energy light with high energy is irradiated, the occurrence of the problem as described above can be reliably prevented, and therefore, an energy light with high energy can be favorably used, and the efficiency of forming the bonded part can be increased. As a result, the productivity of the three-dimensionally shaped article can be made particularly excellent.

What is claimed is:

1. A three-dimensionally shaped article production apparatus, which is an apparatus for producing a three-dimensionally shaped article by stacking a layer formed using a composition containing particles, comprising:
 a three-dimensionally shaped body that comprises a first portion which has a plurality of pores through a height of the three-dimensionally shaped body, and a second portion which does not have the pores or has a plurality of the pores sealed, wherein the second portion is surrounded by the first portion;
a stage, on which the three-dimensionally shaped body is placed; and
a suction unit for adsorbing the three-dimensionally shaped body onto the stage by suction,
wherein the stage is provided with pores penetrating through the stage in a thickness direction and the suction unit is configured to adsorb the three-dimensionally shaped body onto the stage by sucking through the pores provided in the stage, and
wherein the stage is provided with pores penetrating through the stage in the thickness direction to form pore openings on a top surface and a bottom surface of the stage, the suction unit being configured to absorb the three-dimensionally shaped body onto the stage by sucking through the pore openings of the pores in the bottom surface of the stage,
a pore width of the pores provided in the stage is larger than a pore width of the pores provided in the first portion.

2. The three-dimensionally shaped article production apparatus according to claim 1,
wherein the three-dimensionally shaped body comprises a contact surface that is treated to prevent the three-dimensionally shaped article from adhering to the contact surface.

3. The three-dimensionally shaped article production apparatus according to claim 1,
wherein a porosity of the first portion is about 10% by volume or more and 30% by volume or less.

4. The three-dimensionally shaped article production apparatus according to claim 1,
wherein the second portion is surrounded by a plurality of the pores of the first portion with the second portion being disposed within 0.2×L (mm) from an outer periphery of the three-dimensionally shaped body, where L is a length of a surface of the three-dimensional shaped body upon which the layer is formed.

5. The three-dimensionally shaped article production apparatus according to claim 1, wherein the three-dimensionally shaped body includes a portion constituted by a sintered body of particles constituted by a metal material or a ceramic material.

6. The three-dimensionally shaped article production apparatus according to claim 1, wherein the pores are sized such that a solvent included in the composition can be removed through the pores.

7. The three-dimensionally shaped article production apparatus according to claim 1,
wherein the pores are provided in the stage so as to overlap the second portion and the pores in the first portion are provided in a direction perpendicular to a surface of the stage on which the three-dimensionally shaped body is placed.

8. The three-dimensionally shaped article production apparatus according to claim 1,
wherein the suction unit is configured to adsorb the layer onto the three-dimensionally shaped body by sucking through the pores provided in the first portion; and
the suction unit adsorbs the layer onto the three-dimensionally shaped body with a first adsorb power when n layers are stacked onto the three-dimensionally shaped body, and the suction unit adsorbs the layer onto the three-dimensionally shaped body with a second adsorb power larger than the first adsorb power when m layers, which are more than the n layers, are stacked onto the three-dimensionally shaped body.

9. The three-dimensionally shaped article production apparatus according to claim 1, wherein an average pore diameter of the pores in the three-dimensionally shaped body is 0.1 µm or more and 20 µm or less.

10. The three-dimensionally shaped article production apparatus according to claim 1, further comprising:
a composition supply section configured to supply the composition containing particles;
a binding solution ejection section configured to eject a binding solution containing a binding agent toward the composition containing particles;
a curing unit configured to irradiate and cure the binding solution; and
wherein the three-dimensionally shaped body includes a portion constituted by a sintered body of particles constituted by a ceramic material.

11. The three-dimensionally shaped article production apparatus according to claim 10, wherein in the thickness direction, the second portion is provided in a region which does not overlap with a portion of the layer where the binding solution is cured.

12. The three-dimensionally shaped article production apparatus according to claim 10, wherein the suction unit adsorbs the layer onto the three-dimensionally shaped body with a first adsorb power when the binding solution is applied to the composition containing particles, and the suction unit adsorbs the layer onto the three-dimensionally shaped body with a second adsorb power larger than the first adsorb power when the composition containing particles is supplied toward the three-dimensionally shaped body.

13. A three-dimensionally shaped article production apparatus, which is an apparatus for producing a three-dimensionally shaped article by stacking a layer formed using a composition containing particles, comprising:
a three-dimensionally shaped body that comprises a first portion which has a plurality of pores through a height of the three-dimensionally shaped body, and a second portion which does not have the pores or has a plurality of the pores sealed, wherein the second portion is surrounded by the first portion;
a stage, on which the three-dimensionally shaped body is placed; and
a suction unit for adsorbing the three-dimensionally shaped body onto the stage by suction,
wherein the stage is provided with pores penetrating through the stage in a thickness direction to form pore openings on a top surface and a bottom surface of the stage, the suction unit is configured to adsorb the three-dimensionally shaped body onto the stage by sucking through the pore openings of the pores in the bottom surface of the stage, and
wherein in a direction perpendicular to a surface of the stage on which the three-dimensionally shaped body is placed, at least one of the pores provided in the stage is provided so as to overlap the second portion and at least one of the pores provided in the stage is provided so as to overlap at least one of the pores provided in the first portion,
wherein a pore width of the pores provided in the stage is larger than a pore width of the pores provided in the first portion.

* * * * *